(12) United States Patent
Rekai et al.

(10) Patent No.: US 7,583,727 B2
(45) Date of Patent: Sep. 1, 2009

(54) SINGLE ENDED DMT TEST METHOD FOR DETERMINING ADSL CAPABILITY OF CABLES

(75) Inventors: Andre Rekai, Scarborough (CA); Vladislav Narojnyi, Mississauga (CA)

(73) Assignee: Exfo Electro-Optical Engineering, Inc., Quebec City (CA)

( * ) Notice: Subject to any disclaimer, the term of this patent is extended or adjusted under 35 U.S.C. 154(b) by 970 days.

(21) Appl. No.: 10/133,408

(22) Filed: Apr. 29, 2002

(65) Prior Publication Data
US 2003/0095591 A1 May 22, 2003

(30) Foreign Application Priority Data
Nov. 21, 2001 (CA) .................................... 2363370

(51) Int. Cl.
H04B 3/46 (2006.01)

(52) U.S. Cl. .................... 375/225; 379/1.04; 379/22.02

(58) Field of Classification Search ................. 375/224, 375/225; 379/1.04, 22.02
See application file for complete search history.

(56) References Cited

U.S. PATENT DOCUMENTS

| | | | | |
|---|---|---|---|---|
| 6,092,122 A | * | 7/2000 | Liu et al. ..................... | 709/227 |
| 6,266,395 B1 | * | 7/2001 | Liu et al. ................. | 379/27.01 |
| 6,292,468 B1 | * | 9/2001 | Sanderson .................. | 370/241 |
| 6,445,773 B1 | * | 9/2002 | Liang et al. ................ | 379/1.04 |
| 6,625,255 B1 | * | 9/2003 | Green et al. ............... | 379/1.04 |
| 7,116,760 B2 | * | 10/2006 | Smith et al. .............. | 379/22.02 |
| 2003/0026391 A1 | * | 2/2003 | Kamali et al. ............ | 379/27.01 |

* cited by examiner

Primary Examiner—Kevin Y Kim
(74) Attorney, Agent, or Firm—Kramer & Amado, PC

(57) ABSTRACT

A DMT (Discrete Multi-Tone) test method is employed by a single test device to estimate the theoretical and practical data rates of a cable under test for a pair of target ADSL (Asymmetric Digital Subscriber Line) DMT modems. The DMT test can also be used to analyze the cause of a problem, or to predict a problem, whereby a pair of ADSL DMT modems could fail to synchronize. The method includes (a) measuring the frequency characteristics of the cable with discrete tones; (b) measuring the cable noise and interference for every sub-channel of the whole bandwidth; (c) determining the theoretical and practical data rates for every sub-channel, based on the measured frequency characteristics and noise characteristics, as well as modem parameters selected by the user; and (d) estimating the theoretical and practical data rates for the ADSL bandwidth based on the ADSL DMT standard selected by the user.

12 Claims, 4 Drawing Sheets

SINGLE ENDED DMT TEST METHOD FOR DETERMINING ADSL CAPABILITY OF CABLES

This nonprovisional application claims the benefit of Canadian Patent Application No. 2,363,370, filed Nov. 21, 2001.

FIELD OF THE INVENTION

This invention relates to test instrumentation generally and more specifically to instrumentation for testing cables for Asymmetric Digital Subscriber Line (ADSL) applications, such as full rate ADSL and G.Lite ADSL.

BACKGROUND OF THE INVENTION

A number of technologies have emerged to make better use of the bandwidth available on existing copper access networks. One of these technologies is xDSL. The major advantage of high-speed xDSL (Digital Subscriber Line) technologies is that they can all be supported on ordinary copper telephone cables already installed in most commercial and residential buildings. The most promising technology of the xDSL family is ADSL. Full rate ADSL provides downstream data rates of up to 8 Mbps and upstream data rates of up to 1 Mbps. A subset of full rate standard is G.Lite ADSL, which provides downstream data rates of up to 1 Mbps and upstream data rates of up to 512 Kbps depending on the telephone line condition.

The cable qualification test and ADSL modem test are two complementary tests required for deploying and troubleshooting ADSL service over existing copper lines which were originally designed for voice service. The cable qualification test is designed to verify and troubleshoot a cable used for an ADSL service by detecting and measuring any impairment of the cable. The ADSL modem test is used to verify the data rate of a cable and to troubleshoot an ADSL service with a data rate that is lower than expected. Without completing a successful ADSL modem test, service providers can not estimate the practical data rates for a potential ADSL service; a cable qualification test is not sufficient. On the other hand, a service technician can not tell from a failed ADSL modem test what caused the failure unless he or she is able to carry out a comprehensive cable qualification test.

Discrete Multi-Tone (DMT) modulation is the main technique employed by ADSL modems. It is the standard modulation adopted for use in ADSL systems by ANSI (American National Standards Institute), ETSI (European Telecom Standards Institute), and ITU (International Telecommunications Union). A pair of ADSL DMT modems will operate in Frequency Division Multiplexing (FDM) or echo cancellation mode by dividing the available frequency bandwidth into up to 256 sub-channels, or tones. Each sub-channel is modulated using QAM (Quadrature Amplitude Modulation) and carries from 0 to 15 bits/symbol/Hz. The number of bits assigned to each sub-channel is based on the measured Signal to Noise Ratio (SNR) of the cable within the sub-channel. Also, each sub-channel's data rate may be dynamically adjusted to adapt to the varying telephone line characteristics. The overall downstream and upstream data rates of the cable will be the total data rates of those sub-channels allocated for the downstream and the upstream respectively.

A general connection for an ADSL modem test of a local loop is shown in FIG. 1, where the test unit labeled as ATU-C (ADSL Termination Unit—Central) is acting as the ADSL modem at the Central Office (CO) and the other unit labeled as ATU-R (ADSL Termination Unit—Remote) is acting as the ADSL modem at the customer's premises. U-C and U-R stand for the loop interfaces at the CO site and at the remote terminal or customer's premises site. Typically, when doing a field service, one of the test units can be the ADSL device or equipment installed at the CO or at the customer's premises. In accordance with industry terminology, upstream data flows from the ATU-R to the ATU-C, while downstream data flows in the opposite direction.

The present invention provides a powerful tool to estimate the theoretical and practical data rates of a cable for various modem parameters without the need to perform different ADSL modem tests with different sets of ADSL modems. The DMT test method of this invention can also be used to analyze the causes of a problem, or to predict a problem, that a pair of ADSL DMT modems could fail to detect owing to a failure to synchronize.

SUMMARY OF THE INVENTION

Accordingly, in a principal aspect of the invention, a method for performing a DMT test with a single test device comprising a signal transmitter and a signal receiver, without employing DSL modems, on a telephone cable for ADSL application, with a frequency range comprising multiple DMT sub-channels, comprises: measuring cable noise and interference to determine a plurality of total noise levels each noise level for a respective one of a corresponding plurality of said sub-channels; for each of said plurality of said sub-channels, measuring frequency characteristics of the cable using test signals with discrete tones; determining theoretical and practical data rates for each sub-channel based on the measured frequency characteristics and determined total noise levels for that particular sub-channel, and on selected modem parameters; determining the theoretical and practical data rates for a selected DSL bandwidth based on a selected DSL DMT standard and said theoretical and practical data rates for said sub-channels within said selected DSL bandwidth.

In further aspects of the invention:

The test signals and total noise levels are converted into digital form at the receiver for processing;

The measuring of the total noise level for each sub-channel comprises: measuring an amplitude level or energy level of the plurality of total noise levels for sub-channels of an upstream channel and a downstream channel respectively at the test device; and adjusting the AGC setting of the receiver when required;

The measuring of the total noise level for each sub-channel comprises: measuring an amplitude level or energy level of the plurality of total noise levels for all sub-channels of the DSL bandwidth at the test device; and adjusting the AGC setting of the receiver when required;

(d) a time-domain or frequency-domain analysis method is used for measuring the total noise;

(e) the step of measuring the frequency characteristics of the cable comprises: measuring the length of the cable under test using the TDR method; calculating a time window for the cable under test; calculating the lowest frequency fit for the time window; sending individual test tones at the lowest frequency fit into the window, one tone at a time, and up to the maximum power allowable for the cable under test, and receiving reflected signals; adjusting the AGC setting of the receiver for each sub-channel accordingly; measuring the attenuation characteristics of the cable for each sub-channel; calculating the frequency characteristics of the cable for each sub-channel; and extrapolating the frequency characteristics of the cable for DMT tones that did not fit into the time window or for which the reflected signal was too weak;

(f) a time-domain or frequency-domain analysis method is used for detecting and receiving the test signals;

(g) the step of determining the theoretical and practical data rates for each sub-channel based on the measured frequency and noise characteristics and selected modem parameters comprises: converting the measured signal level at the receiver input of the test device to the signal level of a DSL modem receiver for each sub-channel; calculating the optimum signal-to-noise ratio of each sub-channel; calculating the practical signal-to-noise ratio of each sub-channel according to the ADC resolution selected by a user for the target DSL modem; determining the theoretical data rates from the calculated optimum signal-to-noise ratio for each sub-channel for the selected modem parameters; and determining the practical data rates for the calculated practical signal-to-noise ratio for each sub-channel and for the selected modem parameters;

(h) the step of determining the theoretical and practical data rates for the DSL bandwidth based on the selected DSL DMT standard comprises: estimating the theoretical and practical data rates of the upstream channel at U-C according to the selected DSL DMT standard; estimating the theoretical and practical data rates of the downstream channel at U-R according to the selected DSL DMT standard; and estimating the theoretical and practical data rates of the DSL bandwidth according to the selected DSL DMT standard;

(i) the step of determining the theoretical and practical data rates for the DSL bandwidth based on the selected DSL DMT standard comprises estimating the theoretical and practical data rates of the upstream channel and the downstream channel at U-C or U-R or at both sides according to the selected DSL DMT standard;

(j) the steps of determining the theoretical and practical data rates for each sub-channel based on the measured frequency characteristics and total noise, and on selected modem parameters, and of determining the theoretical and practical data rates for a selected DSL bandwidth based on a selected DSL DMT standard, further includes analyzing a failure of a DSL service and/or a DSL modem test by showing, in text or graphic format, the converted measured signal levels, measured cable noise levels, and/or the bits allocated, for each sub-channel of DSL bandwidth or for those sub-channels used by a pair of DSL modems for synchronization purposes

DETAILED DESCRIPTION OF THE INVENTION

A typical ADSL DMT modem test and the DMT test method of the invention will be described, referring to the attached drawings.

For convenience, it has been assumed for the purposes of this description that the ADSL standard is ANSI T1.413 and that Frequency Division Multiplexing (FDM) is used for downstream-upstream separation, as defined in the ANSI TI.413 standard. For other ADSL DMT standards and/or other forms of downstream-upstream separation, the tests will work similarly except for different test signal frequencies. Each cable can transmit signals upstream from the user to the Central Office, and downstream from the Central Office to the user.

Figure 1:
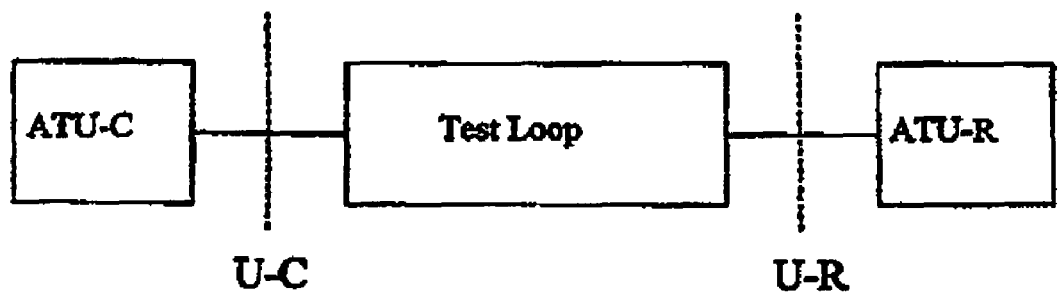
FIG. 1 illustrates, in block diagram form, a test setup for an ADSL modem test on a local loop.

FIG. 1 illustrates a test set-up for a prior art ADSL modem test. At the beginning of the test, the pair of ADSL modems tries to initiate a communications link as follows:

(a) The ATU-C, after power-up or loss of signal, and an optional self-test, may transmit activation tones and await a response from the ATU-R. It makes no more than two attempts; if no response is received, it will wait for an activation request from the ATU-R or an instruction from the network to retry;

(b) The ATU-R, after power-up and an optional self-test, may repeatedly transmit activation requests. If, however, the ATU-R receives a C-TONE, it will remain silent for approximately one minute, unless it detects an activation signal. The C-TONE is defined in the ITU-T G.994.1 standard as being a signaling family for the U-C loop interface side.

Once the communication link is established, the ATU-C transmits a C-Activate signal to start loop timing between the two modems. Loop timing is defined as the combination of the slaving of an ADC clock to the received signal (i.e., to the other transceiver's DAC (Digital to Analog Converter) clock), and tying the local DAC and ADC clocks together.

After the loop timing, the two modems begin sending and receiving mutual training signals to train any receiver equalizer, to adjust automatic gain control (AGC), and to perform channel analysis with several optional settings. Then, wideband pseudo-random signals are sent and received by the two modems to measure the downstream SNR (Signal to Noise Ratio) at the ATU-R and the upstream SNR at the ATU-C. Two significant facts related to the SNR measurement in the prior art method differ from the DMT test method of the invention:

(a) Firstly, in the prior art method, the AGC of each modem is set to an appropriate level for a wideband test signal of frequencies allowed for the modem; and (b) Secondly, in the prior art method, the SNR for each sub-channel is measured at the AGC setting with a wideband pseudo-random signal.

With a performance margin of 6 dB at an error rate of $10^{-7}$, the ATU-C calculates the highest upstream data rate based on the measured SNRs for upstream channels, while the ATU-R calculates the highest downstream data rate based on the measured SNRs for downstream channels.

The formula used to estimate the bits ($b_j$), in units of bits/symbol/Hz, that can be allocated to a sub-channel is:

$$b_j = log_2(1 + SNR_j/\Gamma) \quad (1)$$

where $SNR_j$ is the signal to noise and distortion ratio in power ratio for sub-channel j. For an uncoded system with 0 dB performance margin and an error rate of $10^{-7}$, $\Gamma$ is 9.8 dB or 9.55 in terms of power ratio. For a performance margin of 6 dB at an error rate of $10^{-7}$, the value of $\Gamma$ is 15.8 dB or 38.02 in terms of power ratio. In an ADSL system, error correction coding and an advanced bit loading algorithm can be used to improve system performance. For a coding gain of 3 dB, $\Gamma$ will be 12.8 dB or 19.05 in terms of power ratio.

The maximum upstream data rate and downstream data rate can then be calculated by summing up $b_j$ for all the sub-channels allocated for upstream and downstream respectively.

During the whole process of a prior art modem test, the two ADSL modems employ some twelve tones ranging from 34.5 kHz to 310.5 kHz at a level of −1.65 dBm to −3.65 dBm at 100 ohm to handshake and to maintain synchronization with each other. If, for any reason, the cable noise, interference and/or attenuation at any of these frequencies is too high, a pair of typical ADSL modems will fail to synchronize to complete the ADSL modem test.

The invention involves performing a single ended DMT test equivalent to a number of ADSL DMT modem tests without using a pair of ADSL modems. To estimate the theoretical and practical data rates for the whole bandwidth based on the ADSL DMT standard and modem parameters, the DMT test of the invention measures and calculates the SNR for each sub-channel for the optimum and various practical AGC settings and ADC resolutions.

With the optimum AGC setting, actual AGC setting and actual ADC resolution for each sub-channel in mind, a number of additional facts can now be stated, in addition to the two significant facts previously set out in relation to the SNR measurement in an ADSL modem test:

(a) The ADSL modems measure the SNR for each sub-channel based on the single AGC setting, i.e. an optimum AGC setting for a compound upstream or downstream signal with many modulated tones of different frequencies; therefore, (b) The actual ADC resolution applied to each sub-channel can be less than the normal ADC resolution of a given ADSL modem; in other words, the actual quantization noise for some sub-channels may not be negligible in the SNR calculation;

(c) A pair of ideal ADSL modems with infinite bits of ADC resolution will have an optimum AGC setting for each sub-channel and the quantization noise for each sub-channel will be zero or negligible in the SNR calculation;

(d) Ideal ADSL modems will provide the highest (or the theoretical) data rates of upstream and downstream for a local loop;

(e) It is not possible for an ADSL modem test to estimate theoretical data rates of upstream and downstream since an optimum AGC setting is not possible for each sub-channel;

(f) It is not possible for an ADSL modem test to estimate the practical data rates of upstream and downstream for an ADSL modem with different ADC resolution since the actual ADC resolution for each sub-channel is not the same;

(g) Future ADSL modems could have a higher ADC resolution than current ones to provide data rates closer to the theoretical ones.

Figure 2:
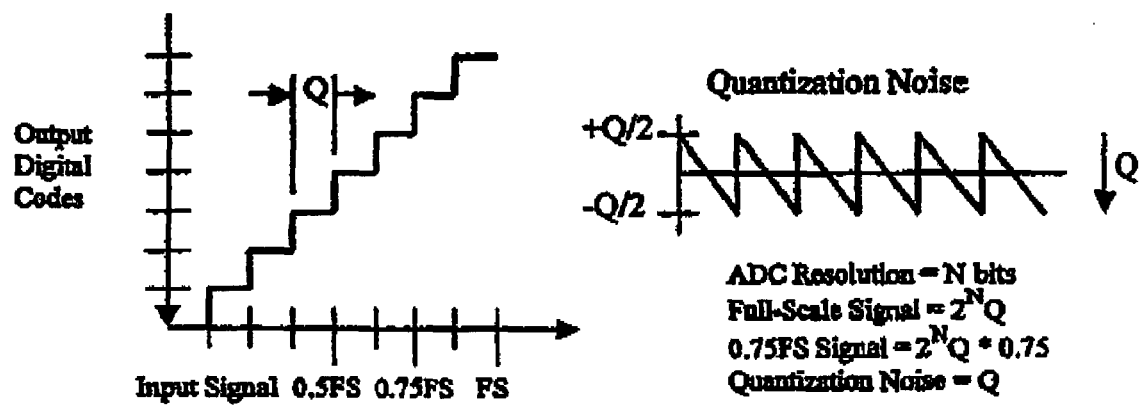
FIG. 2 illustrates the Signal to Quantization Noise Ratio of an ADC (Analog-Digital Converter).

The DMT test method of this invention measures the frequency characteristics of a cable with discrete tones using both time-domain analysis (where signal amplitude is measured versus time) and frequency-domain analysis (where signal amplitude is measured versus frequency). Each tone is sent at the maximum power allowable for sending a single tone and the AGC setting of the receiver is adjusted for each sub-channel accordingly. Assuming that the optimum AGC is set so that the received reflected signal for each sub-channel at ADC is at least half of the full-scale signal, the SNR to quantization noise for each sub-channel can be calculated as illustrated in FIG. 2. For a typical 12-bit ADC, the Vpp of 75% full-scale received signal is $2^{12} \times 0.75 = 3072Q$, and the Vpp of quantization noise is 1Q. Hence, the SNR to quantization noise alone is:

$SNR_{qn0.75} = V_{pp0.75}/V_{pp-qn} = 3072$ or $69.748$ $dB$

According to equation (1), this SNR allows the sub-channel to be allocated up to 17.92 bits for 6 dB performance margin at an error rate of $10^{-7}$ without any coding gain. The sending of individual tones at the maximum power improves SNR to background noise as much as possible. When converting the signal level to the same one of an ADSL modem, an ADC resolution of 12 bits or higher will guarantee 17.92 bits or higher resolution with 6 dB performance margin if the quantization noise is considered for each sub-channel. Since the maximum number of bits per sub-channel is limited to 15, the quantization noise is negligible when calculating the SNR of a sub-channel. After the cable noise and interference for every sub-channel are measured, the SNR obtained for each sub-channel by this method will be close to those obtained by using an ideal ADSL modem.

Figure 3:
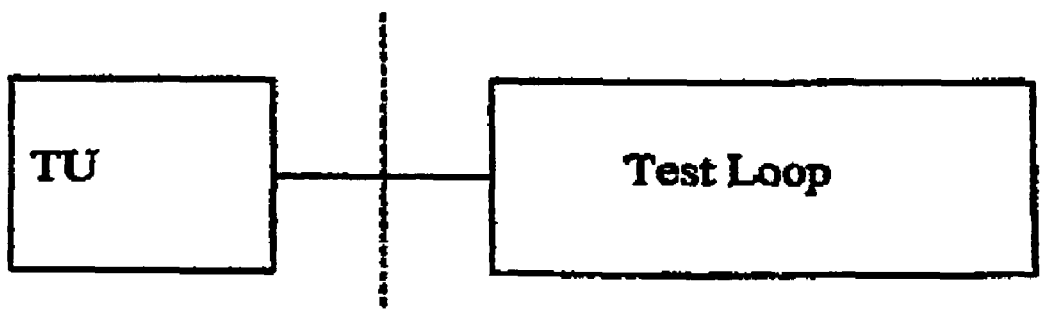
FIG. 3 illustrates, in block diagram form, a test setup for a DMT test on a local loop.

FIG. 3 shows a test setup when the method of the invention is used to carry out a DMT test on a local loop.

Figure 4:
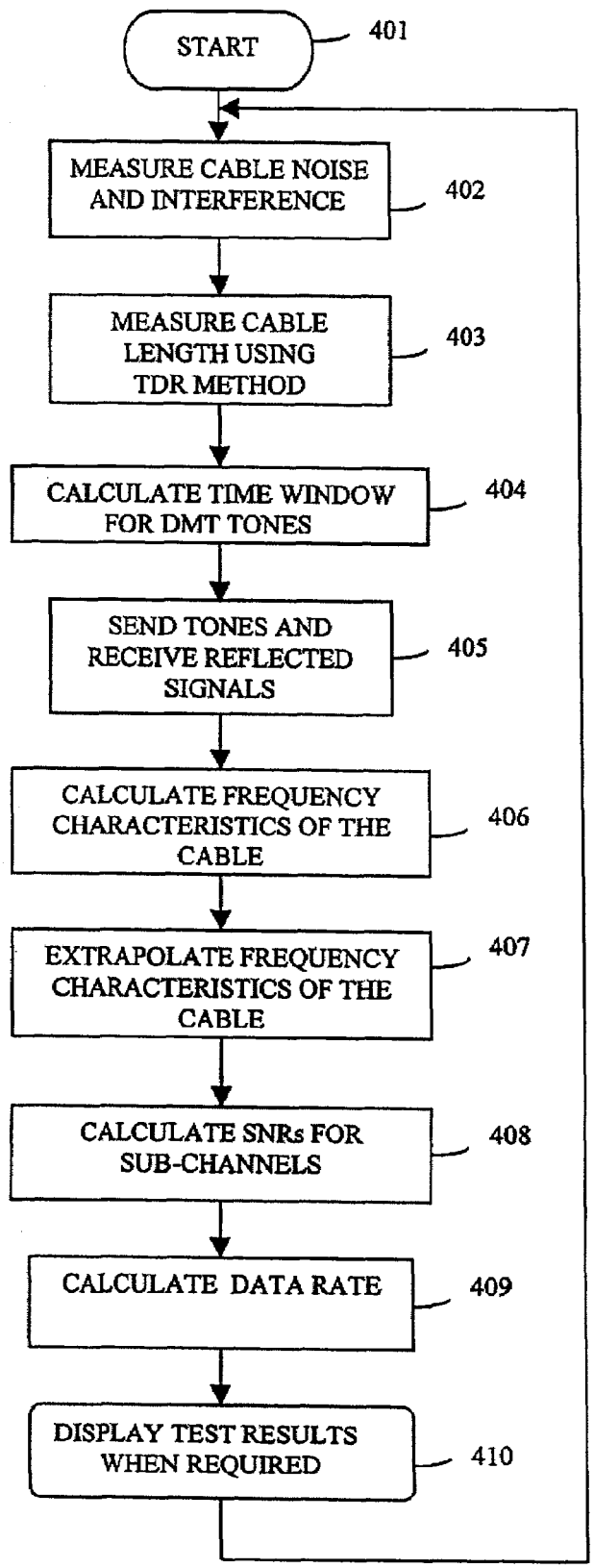
FIG. 4 illustrates, in flow diagram form, an example test device of the invention working in FDM mode executing a DMT test on a local loop.

FIG. 4 illustrates a flow chart for the method of the invention. The user starts a DMT test at a test unit (TU) and inputs the test parameters, such as ADSL standard, performance margin, coding/loading gain, ADC resolution, etc. The TU measures the cable noise and interference (402) of the cable. Using the Time-Domain Reflectometer (TDR) method, the TU determines the length of the cable (403) and time interval τ (window) (404) for sending individual DMT tones. After the window is calculated, TU sends individual tones at the maximum power and receives reflected signals (405) from the far end, starting from the lowest frequency for that window: F0=1/τ. F0 is the lowest frequency fit for that window. The TU calculates frequency characteristics of the cables (407) for the reflected signals above the noise floor, and extrapolates them to the ADSL range using standard charts for cable attenuation (407). Then a measured or extrapolated tone signal level for each upstream and downstream sub-channel is converted to the tone signal level of an ADSL modem, and the TU calculates the SNR (408) and $b_j$ for each upstream and downstream channel. At step (409), the theoretical maximum data rate and practical data rate can be calculated. At step (409), the TU will display the test result, if required, and then go back to step (410) to await another test.

What is claimed is:

1. A method for performing a DMT test with a single test device comprising a signal transmitter and a signal receiver, without employing DSL modems, on a telephone cable, the cable having a near end and a far end, for DSL application with a frequency range comprising multiple DMT sub-channels, comprising:

measuring cable noise and interference to determine a plurality of total noise levels, each noise level for a respective one of a corresponding plurality of said sub-channels;

for each of said plurality of said sub-channels, measuring frequency characteristics of the cable using test tones, said measuring for each sub-channel comprising:

calculating a time window within which said test tones are to be transmitted to the cable under test, transmitting, with said signal transmitter at the near end of the cable, individual test tones within the time window, one tone at a time, at up to a maximum power allowable for the cable under test, receiving, with said signal receiver at the near end of the cable, said individual test tones reflected from the far end of the cable, adjusting an AGC setting of said signal receiver to compensate for frequency-dependency of attenuation in said reflected test tones, measuring attenuation and frequency characteristics of the cable based upon the transmitted test tones and the reflected test tones, and extrapolating the frequency characteristics of the cable for DMT tones that did not fit into the time window or for which the reflected test tones were too weak;

determining theoretical and practical data rates for each of said plurality of said sub-channels based on the measured frequency characteristics and determined total noise levels for that particular sub-channel, and on selected modem parameters; and determining theoretical and practical data rates for a selected DSL bandwidth based on a selected DSL DMT standard and said theoretical and practical data rates for said sub-channels within said selected DSL bandwidth.

2. The method of claim 1, wherein the test tones and total noise levels are converted into digital form at the receiver for processing.

3. A method for performing a DMT test with a single test device comprising a signal transmitter and a signal receiver, without employing DSL modems, on a telephone cable for DSL application with a frequency range comprising multiple DMT sub-channels, comprising:

measuring cable noise and interference to determine a plurality of total noise levels, each noise level for a respective one of a corresponding plurality of said sub-channels;

measuring frequency characteristics of the cable using test signals with discrete tones;

determining theoretical and practical data rates for each sub-channel based on the measured frequency characteristics and determined total noise level for that particular sub-channel, and on selected modem parameters; and determining the theoretical and practical data rates for a selected DSL bandwidth based on a selected DSL DMT standard, wherein the determination of the plurality of total noise levels comprises:

measuring an amplitude level or energy level of the plurality of total noise levels for sub-channels of an upstream channel and a downstream channel respectively at the test device;

adjusting an AGC setting of the receiver when required.

4. A method for performing a DMT test with a single test device comprising a signal transmitter and a signal receiver, without employing DSL modems, on a telephone cable for DSL application with a frequency range comprising multiple DMT sub-channels, comprising:

measuring cable noise and interference to determine a plurality of total noise levels, each noise level for a respective one of a corresponding plurality of said sub-channels;

measuring frequency characteristics of the cable using test signals with discrete tones;

determining theoretical and practical data rates for each sub-channel based on the measured frequency characteristics and determined total noise level for that particular sub-channel, and on selected modem parameters; and determining the theoretical and practical data rates for a selected DSL bandwidth based on a selected DSL DMT standard, wherein determining the plurality of total noise levels comprises:

measuring an amplitude level or energy level of the plurality of total noise levels for all sub-channels of the DSL bandwidth;

adjusting an AGC setting of the receiver when required.

5. The method of claim 3, wherein a time-domain or frequency-domain analysis method is used for measuring each total noise level.

6. The method of claim 4, wherein a time-domain or frequency-domain analysis method is used for measuring each total noise level.

7. A method for performing a DMT test with a single test device comprising a signal transmitter and a signal receiver, without employing DSL modems, on a telephone cable for DSL application with a frequency range comprising multiple DMT sub-channels, comprising:

measuring cable noise and interference to determine a plurality of total noise levels, each noise level for a respective one of a corresponding plurality of said sub-channels;

measuring frequency characteristics of the cable using test signals with discrete tones;

determining theoretical and practical data rates for each sub-channel based on the measured frequency characteristics and determined total noise level for that particular sub-channel, and on selected modem parameters; and determining the theoretical and practical data rates for a selected DSL bandwidth based on a selected DSL DMT standard, wherein measuring the frequency characteristics of the cable comprises:

measuring a length of the cable under test, using a TDR method;

calculating a time window for the cable under test;

calculating a lowest frequency fit for the time window;

sending individual test tones at the lowest frequency fit into the window, one tone at a time, at up to a maximum power allowable for the cable under test, and receiving reflected signals;

adjusting an AGC setting of the receiver for each sub-channel accordingly;

measuring attenuation characteristics of the cable for each sub-channel;

calculating the frequency characteristics of the cable for each sub-channel; and extrapolating the frequency characteristics of the cable for DMT tones that did not fit into the time window or for which the reflected signals were too weak.

8. The method of claim 7, wherein a time-domain or frequency-domain analysis method is used for detecting and receiving the test signals.

9. A method for performing a DMT test with a single test device comprising a signal transmitter and a signal receiver, without employing DSL modems, on a telephone cable for DSL application with a frequency range comprising multiple DMT sub-channels, comprising:

measuring cable noise and interference to determine a plurality of total noise levels, each noise level for a respective one of a corresponding plurality of said sub-channels;

measuring frequency characteristics of the cable using test signals with discrete tones;

determining theoretical and practical data rates for each sub-channel based on the measured frequency characteristics and determined total noise level for that particular sub-channel, and on selected modem parameters; and determining the theoretical and practical data rates for a selected DSL bandwidth based on a selected DSL DMT standard, wherein determining the theoretical and practical data rates for each sub-channel based on the measured frequency characteristics, determined total noise level, and selected modem parameters comprises:

converting a measured signal level at a receiver input of the test device to a signal level of a DSL modem receiver for each sub-channel;

calculating an optimum signal-to-noise ratio ($SNR_o$) of each sub-channel;

calculating a practical signal-to-noise ratio ($SNR_p$) of each sub-channel according to an ADC resolution selected by a user for a target DSL modem;

determining the theoretical data rates from the calculated $SNR_o$ for each sub-channel for the selected modem parameters; and determining the practical data rates from the calculated $SNR_p$ for each sub-channel for the selected modem parameters.

10. The method of claim 1, wherein determining the theoretical and practical data rates for the selected DSL bandwidth based on the selected DSL DMT standard, comprises:

estimating the theoretical and practical data rates of an upstream channel at U-C according to the selected DSL DMT standard;

estimating the theoretical and practical data rates of a downstream channel at U-R according to the selected DSL DMT standard; and estimating the theoretical and practical data rates of the selected DSL bandwidth according to the selected DSL DMT standard.

11. The method of claim 1, wherein determining the theoretical and practical data rates for the selected DSL bandwidth based on the selected DSL DMT standard, comprises:

estimating the theoretical and practical data rates of an upstream channel and a downstream channel at U-C or U-R or at both sides according to the selected DSL DMT standard.

12. A method for performing a DMT test with a single test device comprising a signal transmitter and a signal receiver, without employing DSL modems, on a telephone cable for DSL application with a frequency range comprising multiple DMT sub-channels, comprising:

measuring cable noise and interference to determine a plurality of total noise levels, each noise level for a respective one of a corresponding plurality of said sub-channels;

measuring frequency characteristics of the cable using test signals with discrete tones;

determining theoretical and practical data rates for each sub-channel based on the measured frequency characteristics and determined total noise level for that particular sub-channel, and on selected modem parameters; and determining the theoretical and practical data rates for a selected DSL bandwidth based on a selected DSL DMT standard, wherein determining theoretical and practical data rates for each sub-channel based on the measured frequency characteristics and determined total noise level, and on selected modem parameters, and determining the theoretical and practical data rates for a selected DSL bandwidth based on a selected DSL DMT standard further includes:

analyzing a failure of at least one of a DSL service and a DSL modem test by showing, in text or graphic format, at least one of converted measured signal levels, measured cable noise levels, and bits allocated, for each sub-channel of DSL bandwidth or for times sub-channels used by a pair of DSL modems for synchronization purposes.

* * * * *

UNITED STATES PATENT AND TRADEMARK OFFICE
CERTIFICATE OF CORRECTION

PATENT NO.         : 7,583,727 B2                                          Page 1 of 1
APPLICATION NO.    : 10/133408
DATED              : September 1, 2009
INVENTOR(S)        : Andre Rekai It is certified that error appears in the above-identified patent and that said Letters Patent is hereby corrected as shown below:

Column 10, line 33 "times" should be changed to --those--

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,583,727 B2  
APPLICATION NO. : 10/133408  
DATED : September 1, 2009  
INVENTOR(S) : Rekai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1639 days.

Signed and Sealed this

Fourteenth Day of September, 2010

David J. Kappos  
*Director of the United States Patent and Trademark Office*